United States Patent [19]
Xia et al.

[11] Patent Number: 5,977,731
[45] Date of Patent: Nov. 2, 1999

[54] POWER SYSTEM STABILIZER AND POWER SYSTEM STABILIZATION METHOD

[75] Inventors: Yuou Xia; Masaru Shimomura, both of Tokyo, Japan

[73] Assignee: Mitsubishi Denki Kabushiki Kaisha, Tokyo, Japan

[21] Appl. No.: 09/232,853

[22] Filed: Jan. 19, 1999

[30] Foreign Application Priority Data

Jul. 31, 1998 [JP] Japan .................................. 10-218307

[51] Int. Cl.⁶ .............................. H02P 5/20; G05F 1/70
[52] U.S. Cl. ........................................... 318/147; 323/205
[58] Field of Search ..................................... 323/205, 207, 323/208; 318/147, 149, 156–159

[56] References Cited

U.S. PATENT DOCUMENTS

| | | | |
|---|---|---|---|
| 3,753,063 | 8/1973 | Graf | 318/227 |
| 4,733,156 | 3/1988 | Tanaka et al. | 322/20 |
| 4,967,129 | 10/1990 | Tanaka | 318/621 |
| 5,710,492 | 1/1998 | Konishi et al. | 323/210 |

FOREIGN PATENT DOCUMENTS

| | | |
|---|---|---|
| 8126205 | 5/1996 | Japan . |
| 998600 | 4/1997 | Japan . |

*Primary Examiner*—Matthew Nguyen
*Attorney, Agent, or Firm*—Leydig, Voit & Mayer, Ltd.

[57] ABSTRACT

A power system stabilizer (PSS) and a power system stabilization method estimate system construction parameters (k2 to k6) based on gains and phases of basic frequency components, and estimate an optimum frequency characteristic $G_{PSS}(j\omega)$ of the power system stabilizer (PSS) based on the estimated system construction parameters (k2 to k6).

20 Claims, 4 Drawing Sheets

POWER SYSTEM STABILIZER AND POWER SYSTEM STABILIZATION METHOD

BACKGROUND OF THE INVENTION

1. Field of the Invention

The present invention relates to a power system stabilizer and a power system stabilization method capable of stabilizing the operation of a power system.

2. Description of the Prior Art

A power system stabilizer to be used in a generator excitation system for improving the stability of power system is often referred to as a PSS. Basically, there are a P type PSS and a ω type PSS. The P type PSS inputs a deviation value ΔP (as an input signal indicating a difference from a reference value) of the active electric power of a generator. The ω type PSS inputs a deviation value Δω (as an input signal indicating a difference from a reference value) of the rotational speed of a generator.

Both the PSS generate a control signal corresponding to the input signal and outputs the generated control signal to an automatic voltage regulator (AVR) for a generator in order to suppress the oscillation of active electric power, a terminal voltage potential, and other values of the generator in the power system.

Because the conventional power system stabilizer has the configuration described above, it is possible to suppress the oscillation of generators connected to the power system efficiently when there is no change of operational conditions of the power system. However, if operational conditions of the power system are changed and the oscillation with the frequency modes out of the designated range occurs, it is difficult to suppress the oscillation caused in the power system.

SUMMARY OF THE INVENTION

Accordingly, an object of the present invention is, with due consideration to the drawbacks of the conventional technique, to provide a power system stabilizer and a power system stabilization method capable of suppressing the oscillation of various control values of generators, that are connected to a power system, rapidly and efficiently even if the operational conditions of the power system are changed.

In accordance with a preferred embodiment of the present invention, a power system stabilizer comprises detection means for detecting state values of a generator, extraction means for extracting basic frequency components from said state values detected by said detection means, and for obtaining gains and phases of said basic frequency components, parameter estimation means for estimating system construction parameters based on said gains and phases of said basic frequency components, Frequency characteristic estimation means for estimating an optimum frequency characteristic of said power system stabilizer based on said system construction parameters estimated by said parameter estimation means, and generation means for making a transfer function of said power system stabilizer based on said frequency characteristic estimated by said frequency characteristic estimation means, and for generating a control signal to be provided to an automatic voltage regulator.

In the power system stabilizer as another preferred embodiment of the present invention, said extraction means extracts said basic frequency components from said state values detected by said detecting means only when a deviation value of a power output and a deviation value of a rotational speed of said generator are greater than set values that have been previously set.

In the power system stabilizer as another preferred embodiment of the present invention, said extraction means detects a vibration frequency of each state value detected by said detection means, and outputs said basic frequency components extracted from each state value only when each vibration frequency is approximately equal to each other.

In the power system stabilizer as another preferred embodiment of the present invention, said parameter estimation means estimates said system construction parameters only when a following vibration frequency is different from a previous one.

In the power system stabilizer as another preferred embodiment of the present invention, said frequency characteristic estimation means judges said system construction parameters estimated by said parameter estimation means based on predetermined values, and estimates said frequency characteristic based on a judgement result.

In the power system stabilizer as another preferred embodiment of the present invention, said frequency characteristic estimation means sets target values for both a damping torque and a synchronous torque of said generator in a normal frequency domain in which said generator is capable of suppressing various oscillations rapidly, and estimate said frequency characteristic of said power system stabilizer by using said target values.

In the power system stabilizer as another preferred embodiment of the present invention, said generation means makes a transfer function of said power system stabilizer in a Z domain by using said estimated frequency characteristic of said power system stabilizer.

In the power system stabilizer as another preferred embodiment of the present invention, said generation means makes a time function for said power system stabilizer by approximately converting said estimated frequency characteristic of said power system stabilizer into an impulse response in a time domain.

In the power system stabilizer as another preferred embodiment of the present invention, said detection means supplies test signals to nodes near said generator when said detection means detects said state values.

In the power system stabilizer as another preferred embodiment of the present invention, said parameter estimation means estimates said system construction parameters based on a transfer function in an equivalence control block diagram in which a power system stabilizer effect of said generator is extracted, and a transfer function in an equivalence control block diagram in which an automatic voltage regulator effect of said generator is extracted.

In accordance with another preferred embodiment of the present invention, a power system stabilization method to be executed by a power system stabilizer, comprises the steps of detecting state values of a generator, extracting basic frequency components from said state values, and obtaining gains and phases of said basic frequency components, estimating system construction parameters based on said gains and phases of said basic frequency components, estimating an optimum frequency characteristic of said power system stabilizer based on said system construction parameters, and making a transfer function of said power system stabilizer based on said frequency characteristic, and generating a control signal to be provided to an automatic voltage regulator.

In the power system stabilization method to be executed by a power system stabilizer as another preferred embodiment of the present invention, said basic frequency components are extracted from said state values only when a deviation value of a power output and a deviation value of a rotational speed of said generator are greater than set values that have been set previously.

In the power system stabilization method to be executed by a power system stabilizer as another preferred embodiment of the present invention, a vibration frequency of each state value for each of said state values is detected, and said basic frequency components extracted from each state value are outputted only when each vibration frequency is approximately equal to each other.

In the power system stabilization method to be executed by a power system stabilizer as another preferred embodiment of the present invention, said system construction parameters are estimated only when a following vibration frequency is different from a previous one.

In the power system stabilization method to be executed by a power system stabilizer as another preferred embodiment of the present invention, said system construction parameters are compared with predetermined values, and said frequency characteristic is estimated based on a comparison result.

In the power system stabilization method to be executed by a power system stabilizer as another preferred embodiment of the present invention, target values are set for both a damping torque and a synchronous torque of said generator in a normal frequency domain in which said generator is capable of suppressing various oscillations, and said frequency characteristic of said power system stabilizer is estimated by using said target values of said damping torque and said synchronous torque.

In the power system stabilization method to be executed by a power system stabilizer as another preferred embodiment of the present invention, a transfer function in a Z domain for said power system stabilizer is made by using said estimated frequency characteristic of said power system stabilizer.

In the power system stabilization method to be executed by a power system stabilizer as another preferred embodiment of the present invention, a time function for said power system stabilizer is made by approximately converting said estimated frequency characteristic of said power system stabilizer into an impulse response in a time domain.

In the power system stabilization method to be executed by a power system stabilizer as another preferred embodiment of the present invention, test signals are inputted to nodes near said generator when said state values are detected.

In the power system stabilization method to be executed by a power system stabilizer as another preferred embodiment of the present invention, said system construction parameters are estimated based on a transfer function in an equivalence control block diagram in which a power system stabilizer effect of said generator is extracted, and a transfer function in an equivalence control block diagram in which an automatic voltage regulator effect of said generator is extracted.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

First Embodiment

Figure 1:
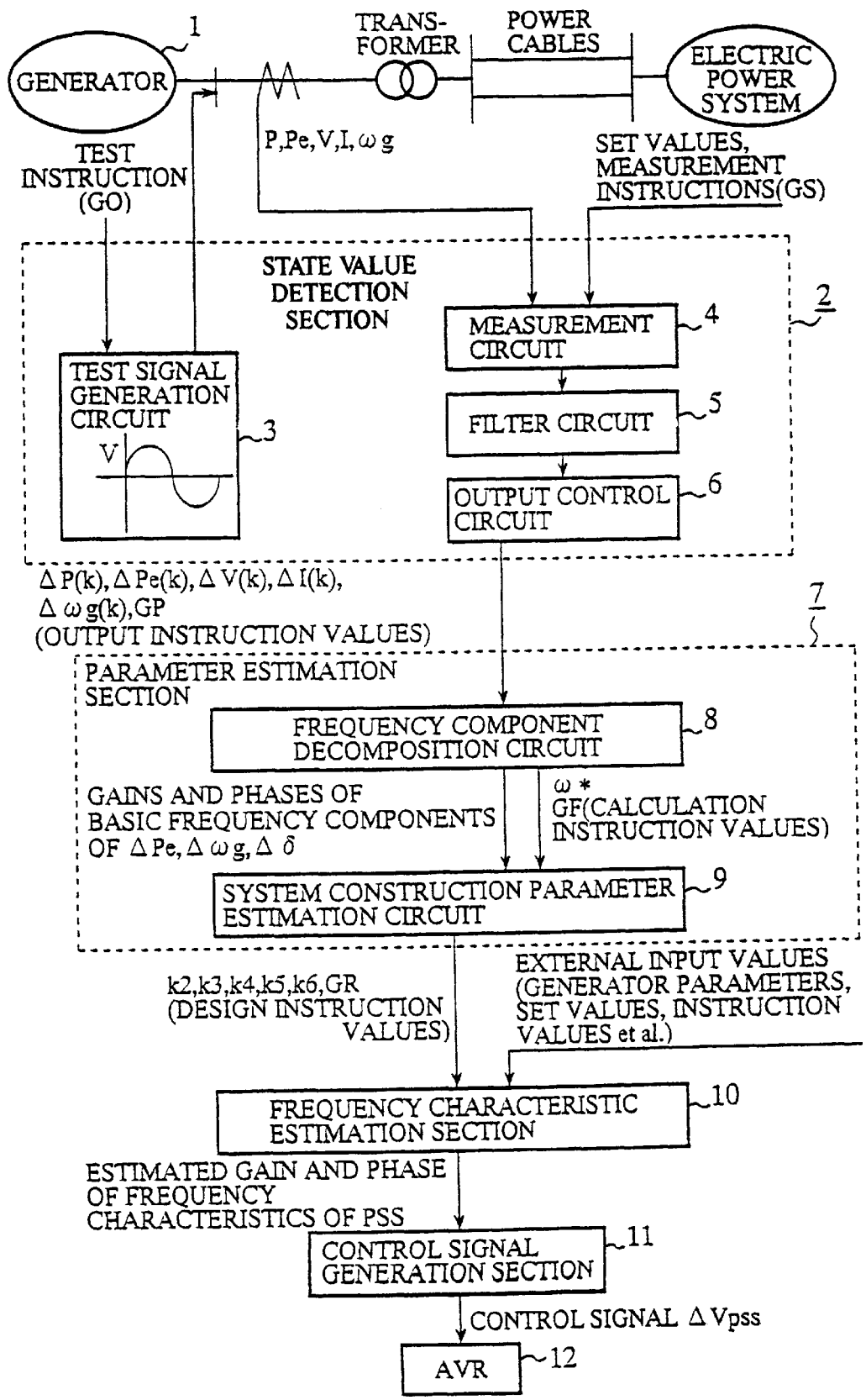
FIG. 1 is a diagram showing a configuration of a power system stabilizer according to the first embodiment of the present invention.

FIG. 1 is a diagram showing a configuration of the power system stabilizer according to the first embodiment of the present invention. In FIG. 1, the reference number 1 designates a generator connected to a power system. The reference number 2 indicates a state value detection section for detecting state values of the generator 1 such as a deviation value $\Delta P$ of an active power of the generator 1, a deviation value $\Delta Pe$ of the electrical power output of the generator 1, a deviation value $\Delta V$ of the voltage at the node near the generator 1, a deviation value $\Delta I$ of a current in a line located near the generator 1, and a deviation value $\Delta \omega$ of a rotational speed of the generator 1. The reference number 3 indicates a test signal generation circuit for generating and outputting test signals to a node near the generator 1 when receiving the signal of the value "1" of a test instruction GO provided externally. The reference number 4 designates a measurement circuit for measuring the state values of the generator 1 when a measurement instruction GS provided externally becomes the value "1". The reference number 5 denotes a filter circuit for eliminating noise components overlapped in the state values of the generator 1 that have already been measured by the measurement circuit 4. The reference number 6 designates an output control circuit for outputting to the parameter estimation section 7 state values of the generator 1 that have been measured during one operational cycle counted from the time when the deviation value $\Delta P$ of the electrical power output becomes greater than a set value Pc and the deviation value $\Delta \omega$ of the rotational speed becomes greater than the set value $\omega gc$.

The reference number 7 designates the parameter estimation section consisting of a frequency component decomposition circuit 8 and a system construction parameter estimation circuit. The reference number 8 denotes the frequency component decomposition circuit for extracting a basic frequency component of each of the state values $\Delta P$, $\Delta \omega g$, $\Delta \delta$, and $\Delta V_{PSS}$ of the generator 1 outputted from the state value detection circuit 2. The reference number 9 indicates the system construction parameter estimation circuit for estimating system construction parameters based on the gain and the phase of each basic frequency component obtained by the frequency component decomposition circuit 8. The reference number 10 designates a frequency characteristic estimation section for estimating an optimum frequency characteristic of the PSS based on the system construction parameters that has been estimated by the parameter estimation section 7. The reference number 11 denotes a control signal generation circuit for updating a transfer function of the PSS or the parameters of PSS based on the frequency characteristic estimated by the frequency characteristic estimation section 10, and for generating a control signal $V_{PSS}$ to be outputted to an AVR 12. The reference number 12 indicates the automatic voltage regulator (AVR) for controlling the voltage that has been generated by and outputted from the generator based on the control signal $\Delta V_{PSS}$ generated by the control signal generation section 11.

Figure 2:
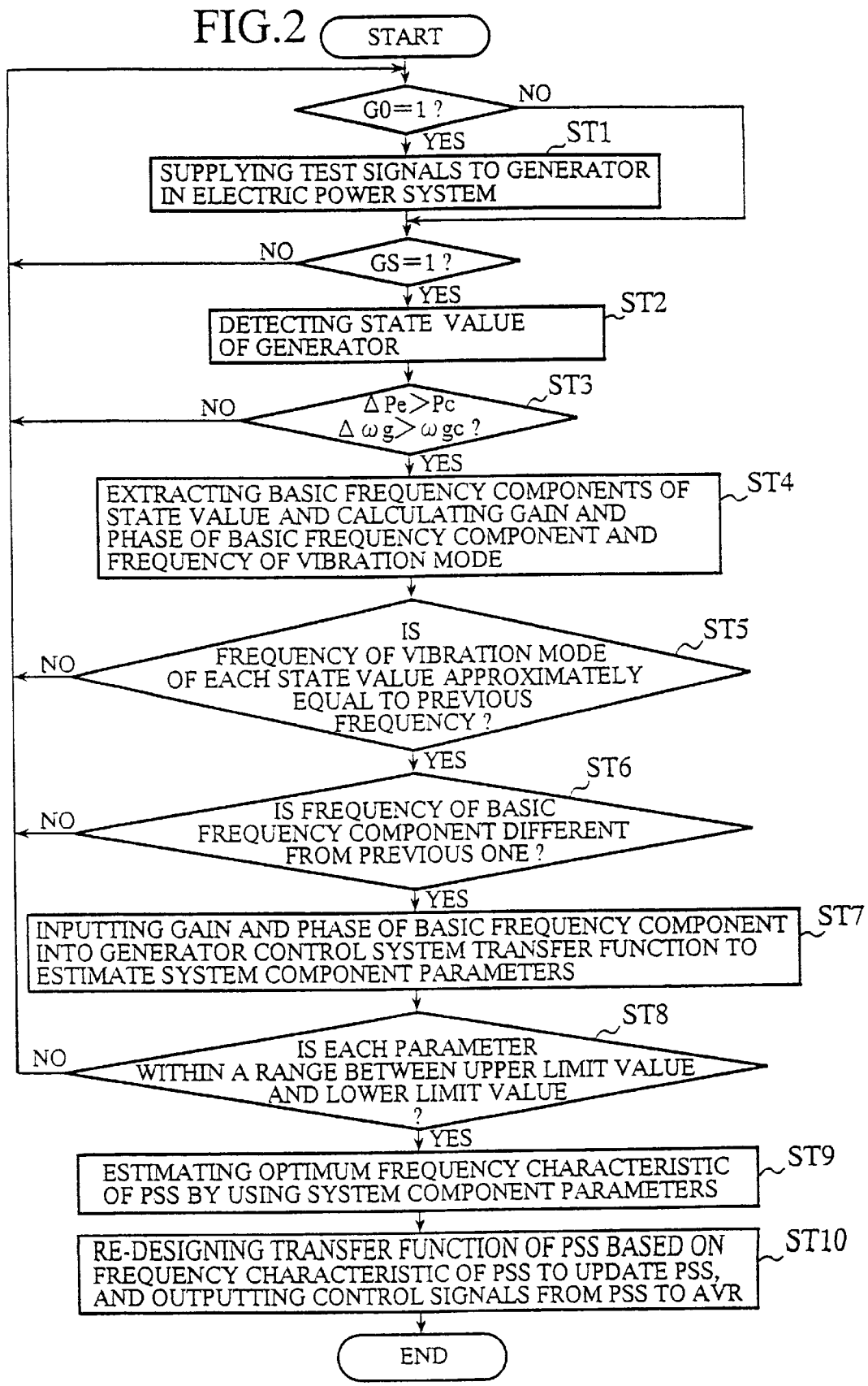
FIG. 2 is a flow chart showing an operation of a power system stabilization method according to the first embodiment of the present invention.

FIG. 2 is a flow chart showing an operation of the power system stabilization method according to the first embodiment of the present invention.

Next, a description will be given of the operation of the power system stabilizer and the power system stabilization method as the first embodiment.

First, in order to know a current operational condition of the power system including a system construction of the power system, test signals are supplied to nodes near the generator 1 without influence on the current operation of the power system. That is, when receiving the test instruction signal GO of the value "1" provided from an external device (omitted from Figures), the test signal generation circuit 3 generates test signals of n types of different frequencies (n is a positive integer) within one operation cycle and outputs them into the node of the generator 1. (Step ST1)

In this case, it is also acceptable to measure the state value of the generator 1 at all times by using the measurement instruction value GS of the fixed value "1".

When the test signal generation circuit 3 outputs the test signal to the node near the generator 1 (or when the external device provides the measurement instruction value GS of the value "1"), the measurement circuit 4 detects the state values of the generator 1 such as a deviation value $\Delta P$ of an active power of the generator 1, a deviation value $\Delta Pe$ of the electrical power output of the generator 1, a deviation value $\Delta V$ of the voltage at the node near the generator 1, a deviation value $\Delta I$ of a current in a line located near the generator 1, and a deviation value $\Delta \omega$ of a rotational speed of the generator 1. (Step ST2)

When the measurement circuit 4 detects the state values of the generator 1, the filter circuit 5 eliminates noise components that are overlapped in the state values of the generator 1. However, because the possibility of the change of the operational condition of the power system is smaller when the electric power output Pe of the generator 1 is not changed in a wide range even if the voltage and other values of the voltage at the node near the generator 1 are changed, the output control circuit 6 judges whether each of the deviation values $\Delta Pe$ of the electric power output and the deviation value $\Delta \omega g$ of the rotational speed is in each acceptable limit or not. That is, the output control circuit 6 judges whether the deviation value $\Delta \omega g$ of the rotational speed is greater than the set value $\Delta \omega c$ or not. (Step ST3) The output control circuit 6 outputs to the parameter estimation section 7 m pair state values (m is a positive integer) of the generator 1 that have been measured during one operational cycle Td counted from the time when this condition is only satisfied, namely when the deviation value $\Delta \omega g$ of the rotational speed is greater than the set value $\Delta \omega c$.

When outputting the state values of the generator 1 to the parameter estimation section 7, the output control circuit 6 also outputs the output instruction value GP of the value "1" to parameter estimation section 7. In addition, when receiving the output instruction value GP of the value "1", the frequency component decomposition circuit 8 in the parameter estimation section 7 executes a Fast Fourier Transformer (FFT) decomposition operation for each state value of the generator 1 in order to obtain the gain and the phase of the basic frequency component, and the frequency $\omega f$ of the vibration mode. Concretely, as shown below, the FFT decomposition operation to the deviation value $\Delta Pe$ of the power output, the deviation value $\Delta \omega g$ of the rotational speed, and the deviation value $\Delta \delta$ of a relative difference angle is executed in order to calculate the gain and the phase of the basic frequency component. (Step ST4) In this case, the deviation value $\Delta \delta$ of the relative difference angle is obtained by executing vector calculation operation among the deviation value $\Delta V$ of the voltage, the deviation value $\Delta I$ of the current, and the deviation value $\Delta P$ of the active electric power.

$$\Delta Pe = KP0 + KP1 \cdot \sin(\omega f1 \cdot t + \theta p) + \quad (1),$$

$$\Delta \omega g = K\omega g0 + K\omega g1 \sin(\omega f1 t + \theta \omega g) + \quad (2),$$

$$\Delta \delta = K\delta 0 + K\delta 1 \cdot \sin(\omega f1 t + \theta \delta) + \quad (3),$$

where KP1, $\theta p$ are a gain and a phase of $\Delta Pe$ when the basic frequency component is $\omega f1$, $K\omega g1$, $\theta \omega g$ are a gain and a phase of $\Delta \omega g$ when the basic frequency component is $\omega f1$, and $K\delta 1$, $\theta \delta$ are a gain and a phase of $\Delta \delta$ when the basic frequency component is $\omega 1$.

Because it can be judged that the measurement accuracy is low when the frequency components $\omega f1$ of each vibration mode are not equal, the frequency component decomposition circuit 8 outputs the calculation instruction value GF of "1" only when the frequencies $\omega f$ of each vibration mode are approximately equal to each other, for example, when the difference between the frequencies is within one percent. (Step ST5)

Because same estimated results may be obtained when the frequency of the vibration mode that has detected now is equal to the frequency of the vibration mode that has been previously detected, a deviation value $\Delta P$ of the active electric power of the generator 1, the frequency component decomposition circuit 8 outputs to the system construction parameter estimation section 9 a deviation value $\Delta Pe$ of the electrical power output of the generator 1, $\Delta \omega g$ a deviation value of the rotational speed, and a phase and a gain of a deviation value $\Delta \delta$ of the relative difference angle, and a frequency $\omega f$ only when the frequency $\omega f$ of the vibration mode is different from the previous frequency. (Step ST9)

Figure 3:
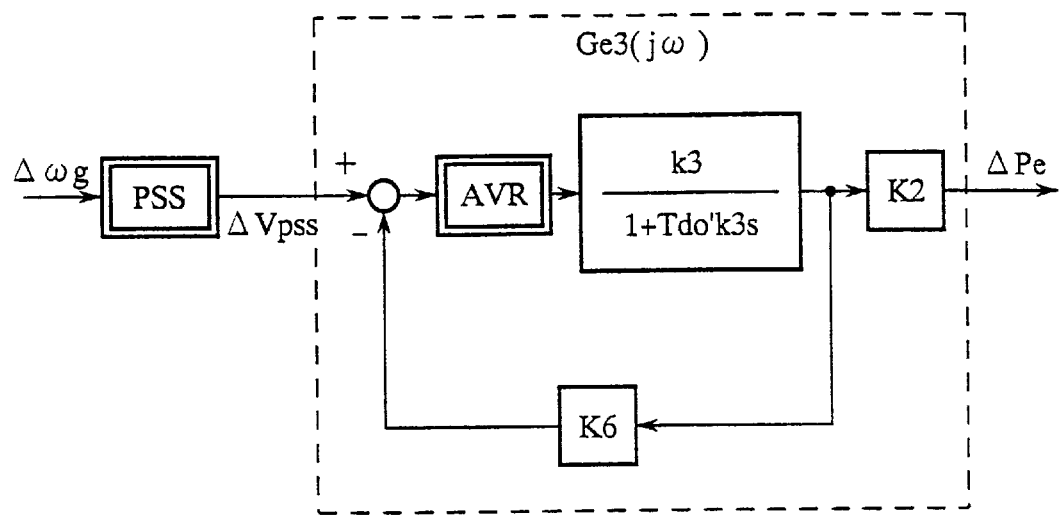
FIG. 3 is a control block diagram showing a PSS effect of an exciting system of a generator.

FIG. 3 is a control block diagram showing a concept of the PSS effect of the exciting system of the generator 1. FIG. 3 shows the transfer function Ge1(j$\omega$) that is obtained by the deviation value $\Delta \omega g$ of the rotational speed and the deviation value $\Delta Pe$ of the electrical power output.

Figure 4:
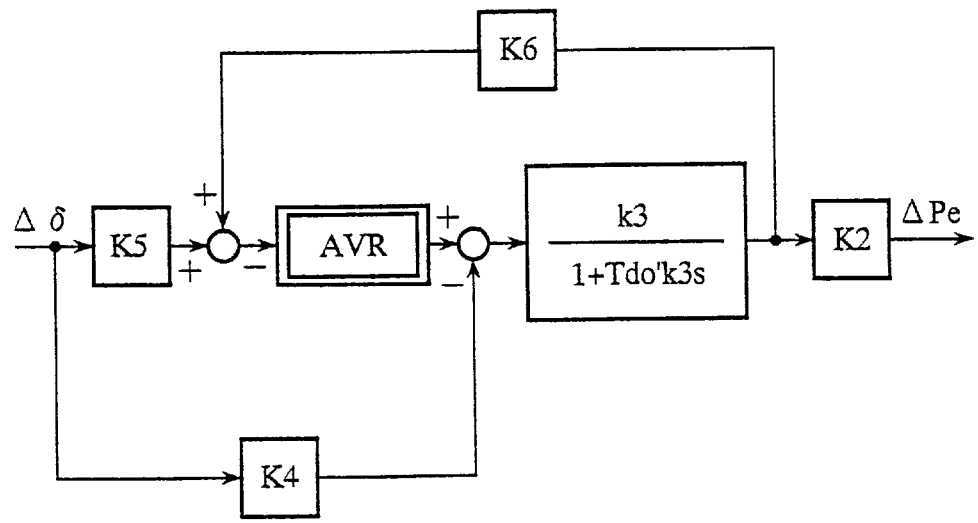
FIG. 4 is a control block diagram showing an AVR effect of the exciting system of the generator.

FIG. 4 is a control block diagram showing the concept of the AVR effect of the exciting system of the generator 1. FIG. 4 shows the transfer function Ge2(j$\omega$) that is obtained by the deviation value $\Delta \delta$ of the relative difference angle and the deviation value $\Delta Pe$ of the electrical power output. Since each block includes the system construction parameters k2 to k6, in order to estimate the system construction parameters k2 to k6 simultaneous equations are solved by inputting the gain and phase of the basic frequency components of the deviation values $\Delta P$, $\Delta \omega g$, and $\Delta \delta$ of the state values of measured k pairs (k is a positive integer), and the frequency $\omega f$ of the vibration mode into the transfer functions Ge1 and Ge2. The detail of the estimation operation for the system construction parameters will be explained below.

$$Ge1(j\omega) = \Delta Pe(j\omega)/\Delta\omega g(j\omega) \qquad (4)$$
$$= k2 \cdot G_{AVR}(j\omega) \cdot G_F(j\omega) \cdot G_{PSS}(j\omega)/$$
$$[1 + k6 \cdot G_{AVR}(j\omega) \cdot G_F(j\omega)]$$

$$Ge2(j\omega) = \Delta Pe(j\omega)/\Delta\delta(j\omega) \qquad (5)$$
$$= -k2\{k4 + k5 \cdot G_{AVR}(j\omega)\} \cdot G_F(j\omega)/$$
$$[1 + k6 \cdot G_{AVR}(j\omega) \cdot G_F(j\omega)]$$

where $\Delta Pe(j\omega) = KP1 \cdot e^{j\theta P}$ $\Delta\omega g(j\omega) = K\omega g1 \cdot e^{j\theta\omega g}$ $\Delta\delta(j\omega) = K\delta 1 \cdot e^{j\theta\delta}$ $G_F(j\omega) = k3/[1 + k3 \cdot Td0' \cdot (j\omega)]$ $G_{AVR}(j\omega)$: Transfer function of AVR
$G_{PSS}(j\omega)$: Frequency characteristic of PSS.

Firstly, the frequency $\omega f$ of the vibration mode is inputted into the frequency $\omega(i)$, where i=m+1, m+2, and m+3. Then, both the transfer function $G_{AVR}$ (j$\omega$(i)) of the AVR and the frequency characteristic $G_{PSS}$ (j$\omega$(i)) of the PSS are calculated, and the calculation results are inputted into the equation (4) and (5), respectively. In addition, when the frequency is $\omega(i)$, the gains KP1(i) and K$\omega$g1(i) and the phases $\theta$p(i), $\theta\omega$g1(i) are inputted into the equation (4), then simultaneous equations can be formed and the system construction parameters k2, k3, and k6 are calculated by solving the simultaneous equations. Secondary, the obtained parameters k2, k3, and k6, and the gains kp1(i), k$\delta$1(i), and the phases $\theta$p(i), $\theta\delta$(i) are inputted into the equation (5), then the parameter k4 and k5 are calculated by solving a linear simultaneous equation obtained from the equation (5).

When the system construction parameters k2 to k6 are obtained by using the above method, the system construction parameter estimation circuit 9 outputs the system construction parameters k2 to k6 and the design instruction value GR of "1" to the frequency characteristic estimation section 10. In this processes, in order to eliminate any measurement error and error operation, the system construction parameters k2 to k6 are not used and the system construction parameters k2 to k6 outputs the design instruction value GR of "0" to the frequency characteristic estimation section 10 when one of or more the system construction parameters k2 to k6 are over upper limit values or below lower limit values. (Step ST8)

When receiving the system construction parameters k2 to k6 and the design instruction value GR of "1", the frequency characteristic estimation section 10 commences the estimation operation for the optimum frequency characteristic of the PSS by using the system construction parameters K2 to k6 received. (Step ST9)

Concretely, the optimum frequency characteristic of the Power System Stabilizer (PSS) is estimated by the following manner.

Firstly, the target values of both a damping torque and a synchronous torque of the generator 1 in a normal frequency band of 0.1 Hz to 20 Hz are set in order to obtain the optimum frequency characteristic of the PSS. Namely, in order to increase the stabilization effect for the power system, it must be required to set the damping torque to an optimum higher value, and to set the synchronous torque of the excitation system to a smaller value as low as possible, simultaneously. Both the damping torque Td and the synchronous torque Tk of the generator control system to determine the damping force of the generator 1 may be expressed below:

$$Td = T_{d\_SYS} + T_{d\_AVR} + T_{d\_PSS} \qquad (6)$$

$$Tk = T_{k\_SYS} + T_{k\_AVR} + T_{k\_PSS} \qquad (7)$$

where $T_{d\_SYS}$ is a damping torque (a constant value) as the inherent value of the power system;

$T_{d\_AVR}$ is a damping torque in the AVR effect that can be calculated by using a system construction parameters k2 to k6 and the transfer function of the AVR12 as shown in FIG. 4;

$T_{d\_PSS}$ is a damping torque in the PSS effect;

$T_{k\_SYS}$ is a synchronous torque (a constant value) as an inherent value of the power system;

$T_{k\_AVR}$ is a synchronous torque in the AVR effect that can be calculated by using the control block as shown in FIG. 4, however it is not required to calculate this synchronous torque $T_{k\_AVR}$ in this case;

$T_{k\_PSS}$ is a synchronous torque in the PSS effect; and

Tk is expected to be equal to the value of $T_{k\_SYS}$, in order to keep the synchronous of the generator 1.

The target value of Td may be obtained properly by analyzing the power system. For simplification, Td is expressed by using a function or an array here. One example will be shown below.

$$Td = 2 \cdot M \cdot \omega \cdot \zeta/(1 - \zeta^2)^{1/2}$$

where M is an inertia constant value of the generator 1, and $\zeta$ is an attenuation factor of the vibration of the power system.

As shown below, since the damping torque $T_{D\_PSS}$ and the synchronous torque $T_{k\_PSS}$ in the PSS effect include the frequency characteristic $G_{PSS}(j\omega)$ and the values Td, Tk, $T_{d\_SYS}$, $T_{d\_AVR}$, $T_{k\_SYS}$ and $T_{k\_AVR}$ are known values, the frequency characteristic $G_{PSS}(j\omega)$ of the PSS may be obtained by the following equations (8) and (9):

In the case that the input signal of the PSS is the deviation value $\Delta\omega g$ of the rotational speed of the generator, $$T_{d\_PSS} = \text{Re}[G_{PSS}(j\omega) \cdot Ge3(j\omega)] \qquad (8)$$
$$= K_{PSS}(\omega) \cdot Ke3(\omega) \cdot \cos(\theta_{PSS}(\omega) + \theta e3(\omega))$$

$$T_{k\_PSS} = -(\omega/\omega 0) \cdot \text{Im}[G_{PSS}(j\omega) \cdot Ge3(j\omega)] \qquad (9)$$
$$= -(\omega/\omega 0) \cdot K_{PSS}(\omega) \cdot Ke3(\omega) \cdot$$
$$\sin(\theta_{PSS}(\omega) + \theta e3(\omega))$$

where $\omega$ is a frequency, $\omega 0$ is a basic frequency (constant value) of the power system, $Ge3(j\omega)$ is a transfer function of the control block designated by the dotted line shown in FIG. 3, $Ke3(j\omega)$ is a gain characteristic of the transfer function $Ge3(j\omega)$, $\theta e3(j\omega)$ is a phase characteristic of the transfer function $Ge3(j\omega)$, $K_{PSS}(\omega)$ is a gain characteristic $G_{PSS}$ (j$\omega$) of the PSS, and $\theta_{PSS}(\omega)$ is a frequency characteristic $G_{PSS}$ (j$\omega$).

Concretely, since the synchronous torque $T_{K\_PSS}$ in the PSS effect is set to zero at the first step (that is, although it is a real case that the synchronous torque $T_{K\_PSS}$ in the PSS effect is equal to the synchronous torque $T_{K\_AVR}$ in the AVR effect and both signs of them are reverse to each other for keeping the synchronous of the generator 1, in general, the synchronous torque $T_{K\_AVR}$ in the AVR effect is greatly smaller than the synchronous torque $T_{K\_SYS}$ as the inherent value of the power system, it is therefore possible to set the synchronous torque $T_{K\_PSS}$ in the PSS effect to zero). Accordingly, the equation (9) may be changed to the following equation (10):

$$\sin(\theta_{PSS}(\omega)+\theta e3(\omega))=0$$

$$\theta_{PSS}(\omega)=-\theta e3(\omega) \quad (10).$$

Further, when the equation (10) is inserted to the equation (8), the damping torque $T_{D\_PSS}$ may be expressed below:

$$T_{D\_PSS}=K_{PSS}(\omega)\cdot Ke3(\omega) \quad (11).$$

When the equation (11) is inserted to the equation (6), the gain characteristic $K_{PSS}$ of the frequency characteristic $G_{PSS}(j\omega)$ may be expressed below:

$$K_{PSS}(\omega)=(Td(\omega)-T_{d\_SYS}-T_{d\_AVR}(\omega))/Ke3(\omega) \quad (12).$$

Because it is thereby possible to obtain both the gain characteristic $K_{PSS}(\omega)$ and the phase characteristic $\theta_{PSS}(\omega)$ of the frequency characteristic $G_{PSS}(j\omega)$, and the frequency characteristic $G_{PSS}(j\omega)$ of the PSS may be obtained. Because the transfer function Ge3(j$\omega$) is obtained by the system construction parameters k2, k3, and k6 (see FIG. 3) and because the transfer function Ge2(j$\omega$) is also obtained by the system construction parameters k2 to k6, it can be considered that the frequency characteristic $G_{PSS}(j\omega)$ is obtained by the system construction parameters k2 to k6. Thus, when the optimum frequency characteristic $G_{PSS}(j\omega)$ of the PSS is obtained, the control signal generation section 11 forms the transfer function of the PSS by using the optimum frequency characteristic $G_{PSS}(j\omega)$ of the PSS, as described below.

Firstly, the control signal generation section 11 calculates an approximate unit impulse response O(t) of the PSS by using the frequency characteristic $G_{PSS}(j\omega)$ of the PSS:

$$o(t) = \frac{2}{\pi}\int_0^\infty \text{Re}(G_{PSS}(j\omega))\cdot \cos(\omega t)d\omega \quad (13)$$

when $t = kT$, $$o(kT) = \frac{2}{\pi}\sum_{i=1}^m \text{Re}(G_{pss}(j\omega))\cdot \cos(\omega ikT)\cdot \Delta\omega \quad (14)$$

In the signal generation section 11, the transfer function of the PSS is expressed by using a pulse function Gp(z) in Z domain as follows:

$$Gp(z) = O(z)/u(z) = O(z) \quad (15)$$

$$= ke(k_0 + k_1 z^{-1} + k_2 z^{-2} + k_3 z^{-3} + \ldots + k_n z^{-n})$$

where O(z) is a Z function of O(t), and u(z) is Z conversion of the unit impulse u(t) of PSS, and u(z)=1.

In an actual case of the control system for the power system, it is difficult to form the control system having a larger N, an error interpolation coefficient Ke is introduced. This error interpolation coefficient Ke is selected corresponding to the N and requirements to the characteristics.

ki=O(iT) (i=0, 1, 2, . . . , n).

The control signal generation section 11 updates the transfer function of the PSS by the pulse function Gp(z). The control signal generation section 11 inserts the deviation value $\Delta\omega g$ of the rotational speed of the generator 1 to the pulse function Gp(z) to generate the control signal $\Delta V_{PSS}$ and outputs the control signal $\Delta V_{PSS}$ to the AVR 12. (Step ST10) Thereby, the oscillation of the generator 1 may be suppressed.

As described above, according to the power system stabilizer and the power system stabilization method as the first embodiment, the system construction parameters k2 to k6 are estimated by using the gain and the phase of the basic frequency component in each state value of the generator and the optimum frequency characteristic $G_{PSS}(j\omega)$ of the PSS is further estimated based on the system construction parameters k2 to k6 in order to form the transfer function of the PSS. Thereby, it is possible to obtain the transfer function of the PSS that matches the operational condition in the current power system. As a result, it is possible to rapidly suppress oscillation of the generator 1 that are caused by changing the current operational conditions.

Second Embodiment

Figure 5:
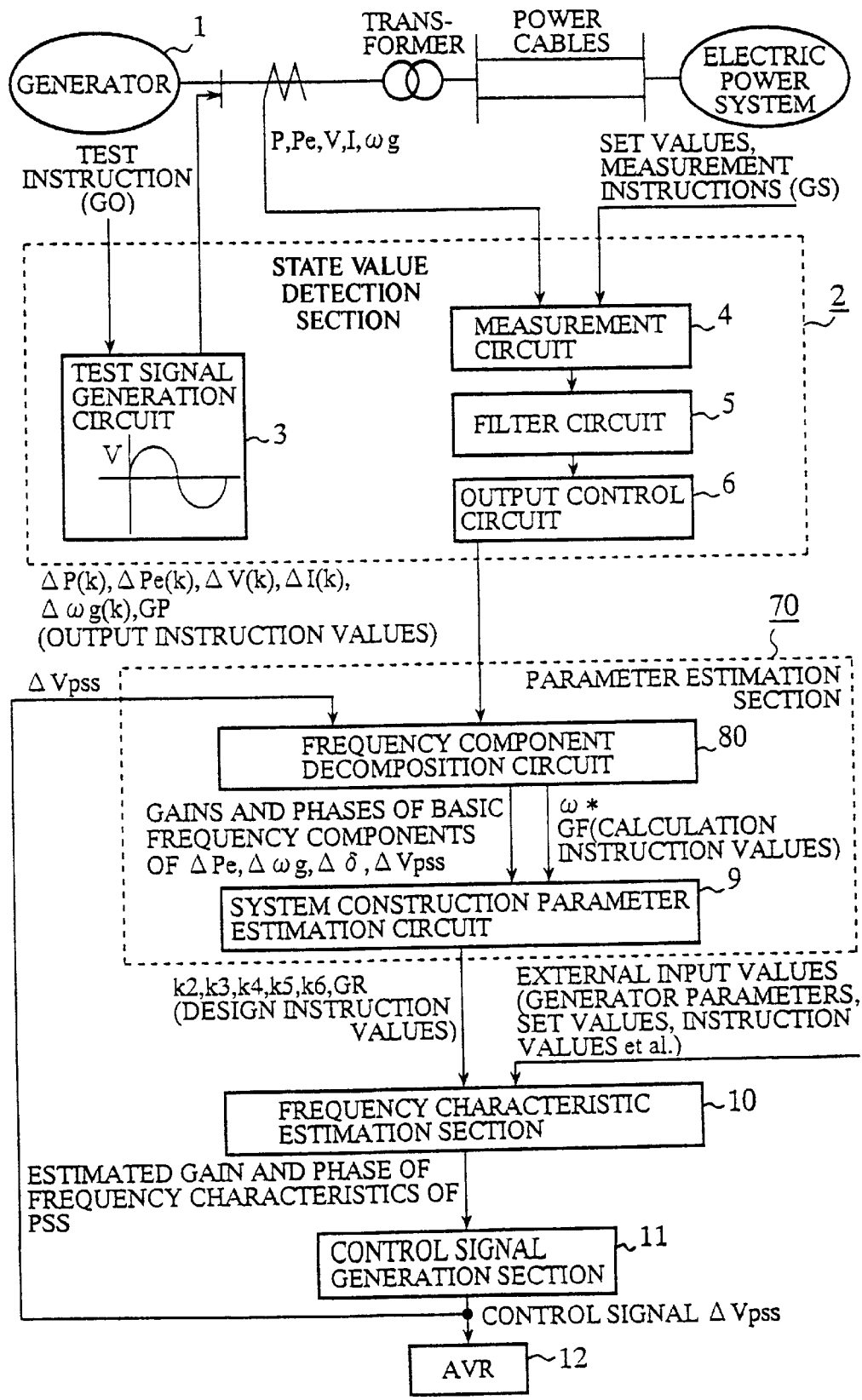
FIG. 5 is a diagram showing a configuration of a power system stabilizer according to the second embodiment of the present invention.

FIG. 5 is a diagram showing a configuration of the power system stabilizer according to the second embodiment of the present invention. In FIG. 5, the reference number 70 designates a parameter estimation section, and the reference number 80 denotes a frequency component decomposition section forming the parameter estimation section 70. Other components in the power system stabilizer as the second embodiment are the same of those components in the power system stabilizer as the first embodiment shown in FIG. 1. Therefore the same reference numbers are used for the same components and the explanation of them is omitted here for brevity.

In the power system stabilizer as the first embodiment shown in FIG. 1, the system construction parameter estimation circuit 9 inserts the transfer function Ge1(j$\omega$) from the deviation value $\Delta\omega g$ of the rotational speed to be inputted into the PSS and the deviation value $\Delta Pe$ of the electrical power output to the gain and the phase of the basic frequency component in order to estimate the system construction components k2, k3, and k6. When the PSS is expressed by a time function, it is difficult for the power system stabilizer of the first embodiment to estimate the system construction parameters k2, k3, and k6 even if the gain and other values of the basic frequency components are inserted into the transfer function Ge1(j$\omega$).

The power system stabilizer as the second embodiment shown in FIG. 5, the frequency component decomposition circuit 80 inputs the control signal $\Delta V_{PSS}$ for the AVR 12 outputted from the control signal generation section 11, and the system construction parameter estimation section 9 estimates the system construction parameters k2, k3, and k6 by using the transfer function Ge3(j$\omega$) of the control signal $\Delta V_{PSS}$ to the deviation value $\Delta Pe$ of the power output.

$$Ge3(j\omega) = \Delta Pe(j\omega)/\Delta V_{PSS}(j\omega) \quad (16)$$

$$= k2\cdot G_{VAR}(j\omega)\cdot G_F(j\omega)/$$

$$[1 + k6\cdot G_{AVR}(j\omega)\cdot G_F(j\omega)].$$

That is, when the frequency is $\omega f(i)$ and i=m+1, m+2, and m+3, the transfer function $G_{AVR}(j\omega(i))$ of the AVR is calculated, and the calculation result is inserted into the equation (16). In addition, simultaneous equations are formed by inserting the gain KP1(i) and the phase $\theta p(i)$ of the deviation value $\Delta Pe$ of the electrical power output and the gain KVp(i) and the phase $\theta ps(i)$ of the control signal $\Delta V_{PSS}$ when the frequency is $\omega f(i)$ into the equation (16), and then the simultaneous equations are solved in order to obtain the system construction parameters k2, k3, and k6. In this case, the gain KVp(i) and the phase $\theta ps(i)$ of the control signal $\Delta V_{PSS}$ and the frequency $\omega f(i)$ of the vibration mode are calculated by performing the FRT decomposition operation to the control signal $\Delta V_{PSS}$ by the frequency component decomposition circuit 80.

Accordingly, according to the power system stabilizer and the method as the second embodiment, it is possible to obtain the optimum transfer function of the PSS that may be applied to the current operational conditions for the power system. As a result, it is possible for the power system stabilizer of the second embodiment to rapidly suppress the oscillations of the generator 1 even if the operational conditions of the power system are changed.

Third Embodiment

In the power system stabilizer and the power system stabilization method according to the first embodiment shown in FIG. 1 to FIG. 4, the control signal generation section 11 uses the frequency characteristic $G_{PSS}(j\omega)$ of the PSS that is expressed by using the pulse function Gp(z) in the Z domain. However, the present invention is not limited by this, for example, it is possible to transform the frequency characteristic $G_{PSS}(j\omega)$ of the PSS into the time function Op(mT) as follows:

$$O_p(mT) = k_f \cdot T \sum_{k=0}^{m} u_{m-k}(kT) \cdot o(kT) \quad (17)$$

wherein u(kT) is an input signal of the PSS, O(kT) is a unit impulse response of a virtual PSS, and kf is an error compensation coefficient.

Accordingly, the power system stabilizer and the method as the third embodiment can obtain the transfer function of the PSS applied to the current operational conditions of the power system. As a result, it is possible for the power system stabilizer of the third embodiment to rapidly suppress the oscillations of the generator 1 even if the operational conditions of the power system are changed.

Fourth Embodiment

In the power system stabilizer and the power system stabilization method according to the first embodiment shown in FIG. 1 to FIG. 4, the frequency characteristic $G_{PSS}(j\omega)$ of the PSS is re-designed by using the deviation value $\Delta\omega g$ of the rotational speed of the generator 1 as the input signal. However, the present invention is not limited by this, for example, it is possible to re-design the frequency characteristic $Gf_{PSS}(j\omega)$ of the PSS by using the deviation value $\Delta f$ of the voltage frequency of the generator 1 as the input signal. That is, since $\omega=2\pi f$, the frequency characteristic $Gf_{PSS}(j\omega)$ of the PSS can be expressed below:

$$Gf_{PSS}(j\omega)=2\pi \cdot G_{PSS}(j\omega).$$

Therefore, the gain characteristic $Kf_{PSS}(\omega)$ and the phase characteristic $\theta f_{PSS}(\omega)$ of the PSS may be expressed by using both the equations (10) and (12) as follows:

$$Kf_{PSS}(\omega) = 2\pi \cdot (Td(\omega) - T_{d\_SYS} - T_{d\_AVR}(\omega))/Ke3(\omega),$$

$$\theta f_{PSS}(\omega) = \theta_{PSS}(\omega)$$

$$= -\theta e3(\omega).$$

Accordingly, the power system stabilizer and the method as the fourth embodiment can obtain the transfer function of the PSS applied to the current operational conditions of the power system. As a result, it is possible for the power system stabilizer of the fourth embodiment to rapidly suppress the oscillation of the generator 1 even if the operational conditions of the power system are changed.

Fifth Embodiment

In the power system stabilizer and the power system stabilization method according to the first embodiment shown in FIG. 1 to FIG. 4, the frequency characteristic $G_{PSS}(j\omega)$ of the PSS is re-designed by using the deviation value $\Delta\omega g$ of the rotational speed of the generator 1 as the input signal. However, the present invention is not limited by this, for example, it is possible to re-design the frequency characteristic $G_{PSS}(j\omega)$ of the PSS by using the deviation value $\Delta P$ of the active power of the generator 1. That is, there is the relationship between the frequency characteristic $G_{PSS}(j\omega)$ of the PSS by using the deviation value $\Delta\omega g$ of the rotational speed and the frequency characteristic $G_{PSS}(j\omega)$ of the PSS by using the deviation value $\Delta P$ of the active power as the input signal. The relationship will be expressed below:

$$Gp_{PSS}(j\omega)=G_{PSS}(j\omega)\cdot Gm(j\omega)$$

$$Gm(j\omega)\approx 1/M\cdot(j\omega).$$

Accordingly, the gain characteristic $K_{PSS}(\omega)$ and the phase characteristic $\theta p_{PSS}(\omega)$ of the PSS are obtained by using both the equations (10) and (12) as follows:

$$Kp_{PSS}(\omega) = |Gm(j\omega)| \cdot K_{PSS}(\omega)$$
$$= |Gm(\omega)| \cdot T_{d\_PSS}(\omega)/Ke2(\omega)$$
$$= (1/M\omega)(Td(\omega) - T_{d\_SYS} - T_{d\_AVR}(\omega))/Ke3(\omega)$$

$$\theta p_{PSS}(\omega) = \theta_{PSS}(\omega) - \pi/2$$
$$= -\theta e3(\omega) - \pi/2.$$

Accordingly, the power system stabilizer and the method as the fifth embodiment can obtain the transfer function of the PSS applied to the current operational conditions of the power system. As a result, it is possible for the power system stabilizer of the fifth embodiment to rapidly suppress the oscillation of the generator 1 even if the operational conditions of the power system are changed.

As described above in detail, according to the present invention, the power system stabilizer (PSS) and the method have the configuration in which detection means detects state values of a generator, extraction means extracts basic frequency components from said state values detected by said detection means, and for obtaining gains and phases of said basic frequency components, parameter estimation means estimates system construction parameters based on said gains and phases of said basic frequency components, frequency characteristic estimation means estimates an optimum frequency characteristic of said power system stabilizer based on said system construction parameters estimated by said parameter estimation means, and generation means makes a transfer function of said power system stabilizer based on said frequency characteristic estimated by said frequency characteristic estimation means, and for generating a control signal to be provided to an automatic voltage regulator (AVR). Accordingly, the frequency characteristic of the PSS that is applied to the current operational condition of the power system can be obtained. As a result, the present invention has the effect that it is possible to suppress oscillation of the generator even if the operational condition of the power system is changed.

In addition, according to the present invention, the power system stabilizer and the method have the configuration in which said extraction means extracts said basic frequency components from said state values detected by said detecting means only when a deviation value of a power output and a deviation value of a rotational speed of said generator are greater than set values that have been previously set. Therefore the present invention has the effect that it is possible to re-design the frequency characteristic of the PSS only when there is a high possibility to change the operational condition of the power system.

Further, according to the present invention, the power system stabilizer and the method have the configuration in which said extraction means detects a vibration frequency of each state value detected by said detection means, and outputs said basic frequency components extracted from each state value only when each vibration frequency is approximately equal to each other. Therefore the present invention has the effect that it is possible to stop the re-design of the frequency characteristic when the detection accuracy of the detection means is low.

Moreover, according to the present invention, the power system stabilizer and the method have the configuration in which said parameter estimation means estimates said system construction parameters only when a following vibration frequency is different from a previous one. Therefore the present invention has the effect that it is possible to stop the estimation operation for the system construction parameters when the current estimation operation will output the same result that has previously calculated.

In addition, according to the present invention, the power system stabilizer and the method have the configuration in which said frequency characteristic estimation means judges said system construction parameters estimated by said parameter estimation means based on predetermined values, and estimates said frequency characteristic based on a judgement result. Therefore the present invention has the effect that it is possible to prevent to cause measurement error and error operation in advance.

Furthermore, according to the present invention, the power system stabilizer and the method have the configuration in which said frequency characteristic estimation means sets target values for both a damping torque and a synchronous torque of said generator in a normal frequency domain in which said generator operates normally, and estimate said frequency characteristic of said power system stabilizer by using said target values. Therefore the present invention has the effect that it is possible to keep the damping torque of a generator control system in an optimum value. As a result, it is possible to suppress vibration caused in a wide frequency domain.

Moreover, according to the present invention, the power system stabilizer and the method have the configuration in which said generation means makes a transfer function of said power system stabilizer in a z domain by using said estimated frequency characteristic of said power system stabilizer. Therefore the present invention has the effect that it is achieved to eliminate the load of a central processing unit.

In addition, according to the present invention, the power system stabilizer and the method have the configuration in which said generation means makes a time function for said power system stabilizer by approximately converting said estimated frequency characteristic of said power system stabilizer into an impulse response in a time domain. Therefore the present invention has the effect that it is achieved to decrease the load of a central processing unit.

Furthermore, according to the present invention, the power system stabilizer and the method have the configuration in which said detection means supplies test signals to nodes near said generator when said detection means detects said state values. Therefore the present invention has the effect that it is possible to detect the state values of the generator even if the state values of the generator are not changed during a on-line state.

In addition, according to the present invention, the power system stabilizer and the method have the configuration in which the state values of the generator may be detected during a on-line state. Therefore there is the effect that it is possible to monitor any change of the operational conditions caused by the change of loads, for example.

Moreover, according to the present invention, the power system stabilizer and the method have the configuration in which said parameter estimation means estimates said system construction parameters based on a transfer function in an equivalence control block diagram in which a power system stabilizer effect of said generator is extracted, and a transfer function in an equivalence control block diagram in which an automatic voltage regulator effect of said generator is extracted. Therefore the present invention has the effect that it is possible to estimate the system construction parameters.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. The power system stabilizer comprising:

detection means for detecting state values of a generator;

extraction means for extracting basic frequency components from the state values detected by the detection means, and for obtaining gains and phases of the basic frequency components;

parameter estimation means for estimating system construction parameters based on the gains and phases of the basic frequency components;

frequency characteristic estimation means for estimating an optimum frequency characteristic of the power system stabilizer based on the system construction parameters estimated by said parameter estimation means; and generation means for generating a transfer function of said power system stabilizer based on the frequency characteristic estimated by the frequency characteristic estimation means, and for generating a control signal to be provided to an automatic voltage regulator.

2. The power system stabilizer as claimed in claim 1, wherein said extraction means extracts basic frequency components from said state values detected by detecting means only when a deviation value of an electrical power output and a deviation value of a rotational speed of said generator are greater than previously set values.

3. The power system stabilizer as claimed in claim 1, wherein said extraction means detects a vibration frequency of each state value detected by said detection means, and outputs the basic frequency components extracted from each state value only when vibration frequencies are approximately equal to each other.

4. The power system stabilizer as claimed in claim 1, wherein said parameter estimation means estimates the system construction parameters only when a vibration frequency is different from a previous vibration frequency.

5. The power system stabilizer as claimed in claim 1, wherein said frequency characteristic estimation means judges the system construction parameters estimated by the parameter estimation means based on predetermined values, and estimates the frequency characteristic based on a judgement result.

6. The power system stabilizer as claimed in claim 1, wherein said frequency characteristic estimation means sets target values for both a damping torque and a synchronous torque of said generator in a normal frequency domain in which said generator is capable of suppressing various oscillations rapidly, and estimates the frequency characteristic of said power system stabilizer using the target values.

7. The power system stabilizer as claimed in claim 1, wherein said generation means makes a transfer function of said power system stabilizer using the estimated frequency characteristic of the power system stabilizer.

8. The power system stabilizer as claimed in claim 1, wherein said generation means generates a time function for said power system stabilizer by approximately converting the estimated frequency characteristic of the power system stabilizer into an impulse response in a time domain.

9. The power system stabilizer as claimed in claim 1, wherein said detection means supplies test signals to nodes near said generator when the detection means detects said state values.

10. The power system stabilizer as claimed in claim 1, wherein said parameter estimation means estimates the system construction parameters based on a transfer function in an equivalence control block diagram in which a power system stabilizer effect of said generator is extracted, and a transfer function in an equivalence control block diagram in which an automatic voltage regulator effect of said generator is extracted.

11. A power system stabilization method to be executed by a power system stabilizer, comprising:

detecting state values of a generator;

extracting basic frequency components from the state values, and obtaining gains and phases of the basic frequency components;

estimating system construction parameters based on the gains and phases of the basic frequency components;

estimating an optimum frequency characteristic of the power system stabilizer based on the system construction parameters; and generating a transfer function of the power system stabilizer based on the frequency characteristic, and generating a control signal to be provided to an automatic voltage regulator.

12. The power system stabilization method to be executed by a power system stabilizer as claimed in claim 11, wherein the basic frequency components are extracted from the state values only when a deviation value of an electrical power output and a deviation value of a rotational speed of said generator are greater than previously set values.

13. The power system stabilization method to be used by a power system stabilizer as claimed in claim 11, wherein a vibration frequency of each state value for each of the state values is detected, and the basic frequency components extracted from each state value are outputted only when vibration frequencies are approximately equal to each other.

14. The power system stabilization method to be used by a power system stabilizer as claimed in claim 11, wherein the system construction parameters are estimated only when a vibration frequency differs from a previous vibration frequency.

15. The power system stabilization method to be used by a power system stabilizer as claimed in claim 11, wherein the system construction parameters are compared with predetermined values, and the frequency characteristic is estimated based on a comparison result.

16. The power system stabilization method to be used by a power system stabilizer as claimed in claim 11, wherein target values are set for both a damping torque and a synchronous torque of said generator in a normal frequency domain in which said generator is capable of suppressing oscillations rapidly, and the frequency characteristic of said power system stabilizer is estimated using the target values of the damping torque and the synchronous torque.

17. The power system stabilization method to be used by a power system stabilizer as claimed in claim 11, wherein a transfer function for said power system stabilizer is made by using the estimated frequency characteristic of said power system stabilizer.

18. The power system stabilization method to be used by a power system stabilizer as claimed in claim 11, wherein a time function for said power system stabilizer is made by approximately converting the estimated frequency characteristic of said power system stabilizer into an impulse response in a time domain.

19. The power system stabilization method to be used by a power system stabilizer as claimed in claim 11, wherein test signals are inputted to nodes near the generator when the state values are detected.

20. The power system stabilization method to be used by a power system stabilizer as claimed in claim 11, wherein the system construction parameters are estimated based on a transfer function in an equivalence control block diagram in which a power system stabilizer effect of the generator is extracted, and a transfer function in an equivalence control block diagram in which an automatic voltage regulator effect of said generator is extracted.

* * * * *